Feb. 5, 1963 G. DE MESTRAL 3,076,244
DEVICE FOR CONNECTING TWO FLEXIBLE PARTS
Filed Aug. 11, 1959 2 Sheets-Sheet 1
FIG. 1
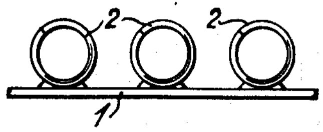
FIG. 2
2
1
FIG. 4
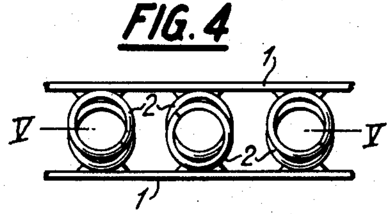
FIG. 3
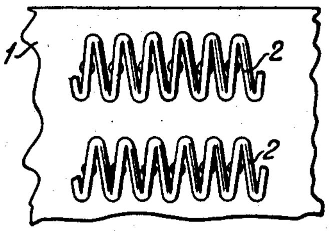
FIG. 6
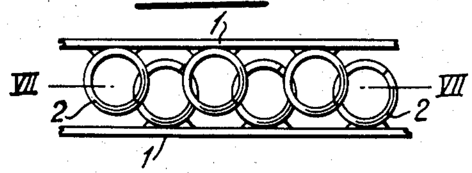
FIG. 5
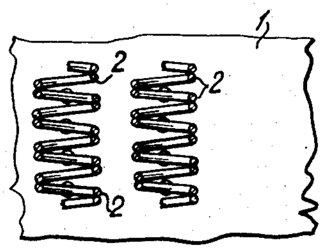
FIG. 7
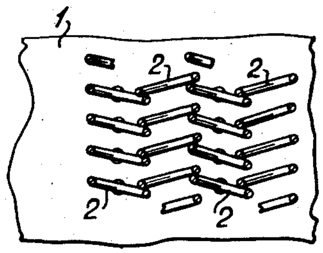
INVENTOR
GEORGE DE MESTRAL
BY Emory L. Groff
ATTORNEY Feb. 5, 1963 G. DE MESTRAL 3,076,244
DEVICE FOR CONNECTING TWO FLEXIBLE PARTS
Filed Aug. 11, 1959 2 Sheets-Sheet 2
FIG. 8
FIG. 9
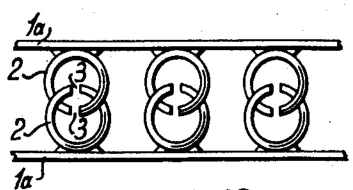
FIG. 10
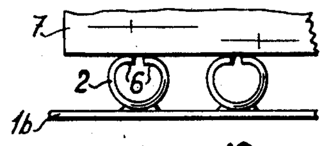
FIG. 13
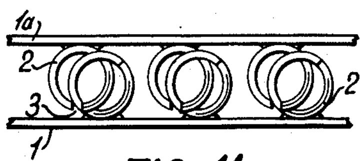
FIG. 11
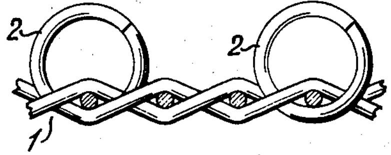
FIG. 14
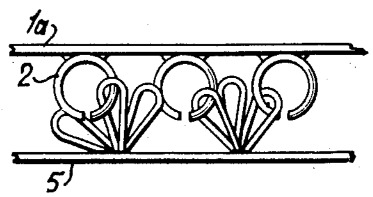
FIG. 12
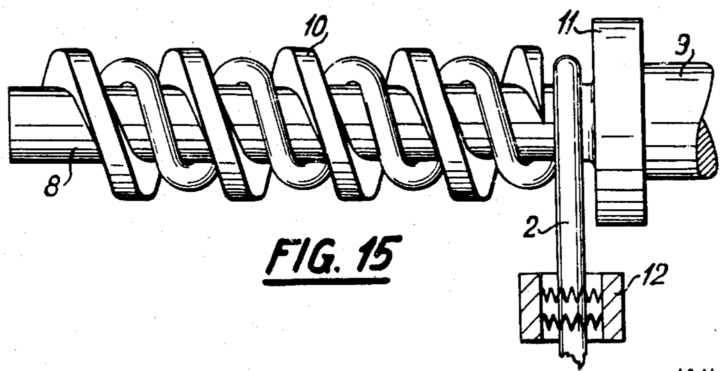
FIG. 15
INVENTOR
GEORGE DE MESTRAL
BY Emory L. Groff
ATTORNEY United States Patent Office 3,076,244
Patented Feb. 5, 1963

3,076,244

DEVICE FOR CONNECTING TWO FLEXIBLE PARTS

George de Mestral, Commugny, Switzerland, assignor, by mesne assignments, to Velcro S.A., Lenzerheide, Grisons, Switzerland, a corporation of Switzerland Filed Aug. 11, 1959, Ser. No. 833,083
Claims priority, application Switzerland Aug. 20, 1958
4 Claims. (Cl. 24—203)

The present invention has for its subject a device for joining together two overlying or overlapped flexible parts, comprising two sheets provided with hooking members adapted to be applied one against the other. This device is characterised in that the connector members of at least one of the sheets are formed from wires rolled in the form of a helix and secured to the sheet in such a manner that the axis of the helix is approximately parallel to the general plane of the sheet.

The invention also has for its subject a process of manufacture of the connection device indicated above, this process being characterised by the fact that threads of artificial material are rolled in the form of a helix and are secured to the corresponding sheet.

The invention also has for its subject an apparatus enabling the above-mentioned process to be carried into effect, characterised in that it comprises a rod entrained in continuous rotation about its geometrical axis, a stationary guide of helicoidal shape being engaged around said rod for guiding the thread on the rod and ensuring its winding in the form of a helix in a continuous manner, said heating means allowing of the thermal treatment of the thread so that it retains the shape of a helix.

A number of forms of construction of the connecting device according to the invention are shown diagrammatically and by way of example in the accompanying drawings, wherein:

FIGS. 1 to 3 show respectively in end view, side view and plan view, a first form of construction of one of the sheets which the connecting device comprises.

FIG. 4 shows how the two connector members of two sheets established according to the first form of construction shown in FIGS. 1 to 3, can engage with one another when the two sheets are pressed one against the other.

FIG. 5 is a section on the line V—V of FIG. 4, showing the cooperation of the connector members of the two sheets one with the other.

FIG. 6 shows a second possibility of engagement of the connector members of the two sheets with one another.

FIG. 7 is a view in section on the line VII—VII of said FIG. 6.

FIGS. 8 and 9 show a second form of construction of the connector members respectively in end view and side view.

FIG. 10 shows how the connector members of two sheets according to FIGS. 8 and 9 engage with one another when the two sheets are pressed one against the other.

FIG. 11 shows the engagement of the connector members of a sheet according to FIGS. 8 and 9 with the connector members of a sheet according to FIGS. 1 to 3.

FIG. 12 shows the engagement of the hooking members of a sheet according to FIGS. 8 and 9 in the loops of terry-looped fabric.

FIG. 13 shows a modification of a sheet according to FIGS. 8 and 9.

FIG. 14 shows a modification of the manner of securing the connector members to the sheet which serves as their support.

FIG. 15 is a diagrammatic representation of the apparatus utilised for the fabrication of the connecting device.

The device for connecting two flexible parts, described above with reference to the drawing, comprises two sheets each provided with hooking members. Each of these sheets, ribbons or strips, is thus adapted, for example to be fixed to a part of a garment, the closing of the garment being effected by applying the two sheets one against the other under manual pressure, in such a manner that their interlocking members are concealed by the sheet and frictionally engage with each other, which thus ensures the maintenance of the two sheets by adherence. In the first form of construction of the connecting device, each sheet is formed by a support 1 constituted, for example, by a fabric, by a plate or by a ribbon of any suitable material, to which are secured threads 2, preferably by artificial material, for example nylon (but may also be of another material, for example of silk, of cotton, eventually enclosed or covered with artificial material, or even of metal), these threads being wound in a helix and located on the support 1 in such a manner that the axis of the helix is approximately parallel to the general plan of the sheet. These threads 2 wound in the form of a helix may be secured to the sheet 1, for example by gluing, by soldering or by finishing, according to the characteristics of the sheet.

FIG. 3 shows the position that different helical threads 2 can occupy on their respective sheets.

When two sheets of the type of that shown in FIG. 3 are engaged one against the other, the spirals of threads 2 wound in a helix, engage with one another by provoking a slight torsion of each spiral. This torsion which determines an elastic deformation of each spiral, provokes friction of the spirals against one another, ensuring the maintenance by adherence, of the two sheets against one another. The resistance to separation of the two sheets thus hooked together, under the action of a shearing force exerted in the direction of the axis of helices, is particularly high. The separation of the two sheets may always be effected easily by lifting one of these sheets relatively to the other at one of its extremities.

FIGS. 6 and 7 show a second position which the helical threads 2 of the two sheets may occupy in staggered relation relatively to the others, when these are engaged one relatively to the other.

It will be understood, in a modification, that instead of arranging the threads in the regular manner of a helix on their respective sheet, it is possible to dispose these in an irregular manner. It is thus also possible to select winding paths of winding in a different helix for some threads 2 relatively to the others.

In the second form of construction shown in FIGS. 8 and 9, the connecting device is formed by sheets similar to those shown in FIGS. 1 to 3. However, in at least one of these sheets, at least some of the helical threads 2 wound in the form of a helix, are cut at 3 at any point of their circumference substantially opposed to the fiixing point 4 to the corresponding sheet 1*a*. Thus, the convolute thread spirals 2 form hooks. For this reason, when two sheets of the type of those shown in FIGS. 8 and 9 are engaged one against the other, the connector members formed by the threads 2 are retained one in another, not only by the lateral friction of the convolutions one against the other but also by the hooking action of the convolutions of one of the sheets in the spirals of the other sheet.

FIG. 11 shows a third form of construction of the connection device composed of a sheet 1 of the type of that shown in FIGS. 1 to 3 and of a sheet 1*a* such as shown in FIGS. 8 and 9. These two sheets thus remain interengaged with one another, by reason of the friction of the helical threads 2 engaged with one another and by reason of the hooking of the cut spirals of the sheet 1*a* in the closed spirals of the sheet 1.

FIG. 12 shows a fourth form of construction of the connecting device using a sheet 1*a* provided with cut spirals and a sheet 5 constituted preferably by a fabric of the terry-looped type. When such a sheet 5 is engaged against a sheet 1*a*, the hooks which are cut from the spirals of the sheet 1*a* engage in the loops, disposed irregularly, of the terry-looped fabric, and remain gripped in this.

In a modification, and for forming hooks capable of assuring a greater resistance to the hooking of two sheets of the connecting device, it is possible to impart a more accentuated curvature to the cut ends 6 of the spirals of the threads 2, by flattening them, by means of a hot iron 7 for example (FIG. 13), in such a manner as to provoke a deformation of these ends 6 imparting to them a more marked hook shape. The sheet 1*b* thus obtained will thus ensure a better resistance to hooking when it is used by co-operating with a sheet 1*b* of the same type, a sheet 1, a sheet 1*a* or a sheet 5.

FIG. 14 shows a different method of securing the helical threads 2 to their support 1 constituting the sheet. In this modified form of construction the helical threads 2 are secured or anchored in the support 1, which is constituted by a fabric during the weaving of this. It will be understood that it is also possible in this latter form of construction, to effect an adhesion of the helical threads 2 in the fabric forming the sheet.

The threads 2 wound in the form of a helix may be obtained in any known manner. However, an apparatus allowing of an easy fabrication of these coils of threads 2 is shown in FIG. 15. This apparatus comprises a rod 8 adapted to be driven in continuous rotation about its geometrical axis by a motor shaft 9. A stationary guide 10, of helicoidal shape, is engaged around said rod 8. The thread 2 of artificial material is applied to one end of the rod 8 carrying the guide flange 11. Before it reaches the proximity of the rod 8, the thread 2 is subjected to a thermal treatment by means of a heating body 12, of any known type, by radiation, high frequency, infra-red or convection (hot air). The thread which is thus softened by the effect of the hot body 12, is driven by the rod 8 which is in rotation. The thread 2 is thus guided between the spirals of the stationary guide 10, in such a manner that it forms a helix of which it retains the shape after cooling.

It will be understood that this apparatus only shows a single possible means enabling the threads 2 to be wound in a helix. Other known means may be used for this purpose.

On the other hand, in the case of the form of construction shown in FIG. 14, each thread 2 may be wound in the form of a helix in accordance with the operation of weaving of the sheet 1 by which it is carried.

I claim:

1. A device for releasably connecting two overlapping sheets or the like together, comprising, at least a pair of adjacent complementary connecting members carried by the inner facing sides of each of said sheets, said members each being in the form of a single elongated coil composed of spaced apart adjacent convolutions whose longitudinal axes are parallel to the sheet, said convolutions having related edge portions attached to the same sheet, said adjacent connecting members on each sheet being spaced from each other a distance which is smaller than the diameter of the convolutions of said members, said members having their convolutions frictionally interlocked to hold the sheets together by manually pressing the said sheets toward each other in a direction perpendicular to the plane of said sheets and to be released by manually pulling the sheets apart.

2. A fastening device according to claim 1, wherein the means attaching the related edge portions of said convolutions to said sheets includes woven threads of said sheets.

3. A fastening device according to claim 1, wherein the convolutions are continuous throughout from end to end and are disposed in adjacent parallel rows.

4. A fastening device according to claim 1, wherein the means attaching the related edge portions of said convolutions to said sheets comprises glue.

References Cited in the file of this patent

UNITED STATES PATENTS

| | | |
|---|---|---|
| 650,947 | Muhlhauser | June 5, 1900 |
| 1,846,919 | Sundback | Feb. 23, 1932 |
| 1,846,920 | Sundback | Feb. 23, 1932 |
| 1,891,550 | Lawrence | Dec. 20, 1932 |
| 2,262,881 | Boenecke | Nov. 18, 1941 |
| 2,450,324 | Wilson | Sept. 28, 1948 |
| 2,504,079 | Murphy | Apr. 11, 1950 |
| 2,717,437 | De Mestral | Sept. 13, 1955 |
| 2,856,664 | Nagel | Oct. 21, 1958 |
| 2,858,592 | Schwartz | Nov. 4, 1958 |
| 2,903,745 | Hansen | Sept. 15, 1959 |
| 2,907,088 | Hansen | Oct. 6, 1959 |
| 2,920,351 | Hardesty | Jan. 12, 1960 |
| 2,929,135 | Cromberg | Mar. 22, 1960 |

FOREIGN PATENTS

| | | |
|---|---|---|
| 118,139 | Australia | Feb. 14, 1944 |
| 498,008 | Belgium | Jan. 2, 1951 |
| 1,135,970 | France | May 7, 1957 |